(No Model.)  3 Sheets—Sheet 1.
B. W. GRIST.
REVERSING MECHANISM FOR GAS OR OTHER ENGINES.
No. 599,779. Patented Mar. 1, 1898.
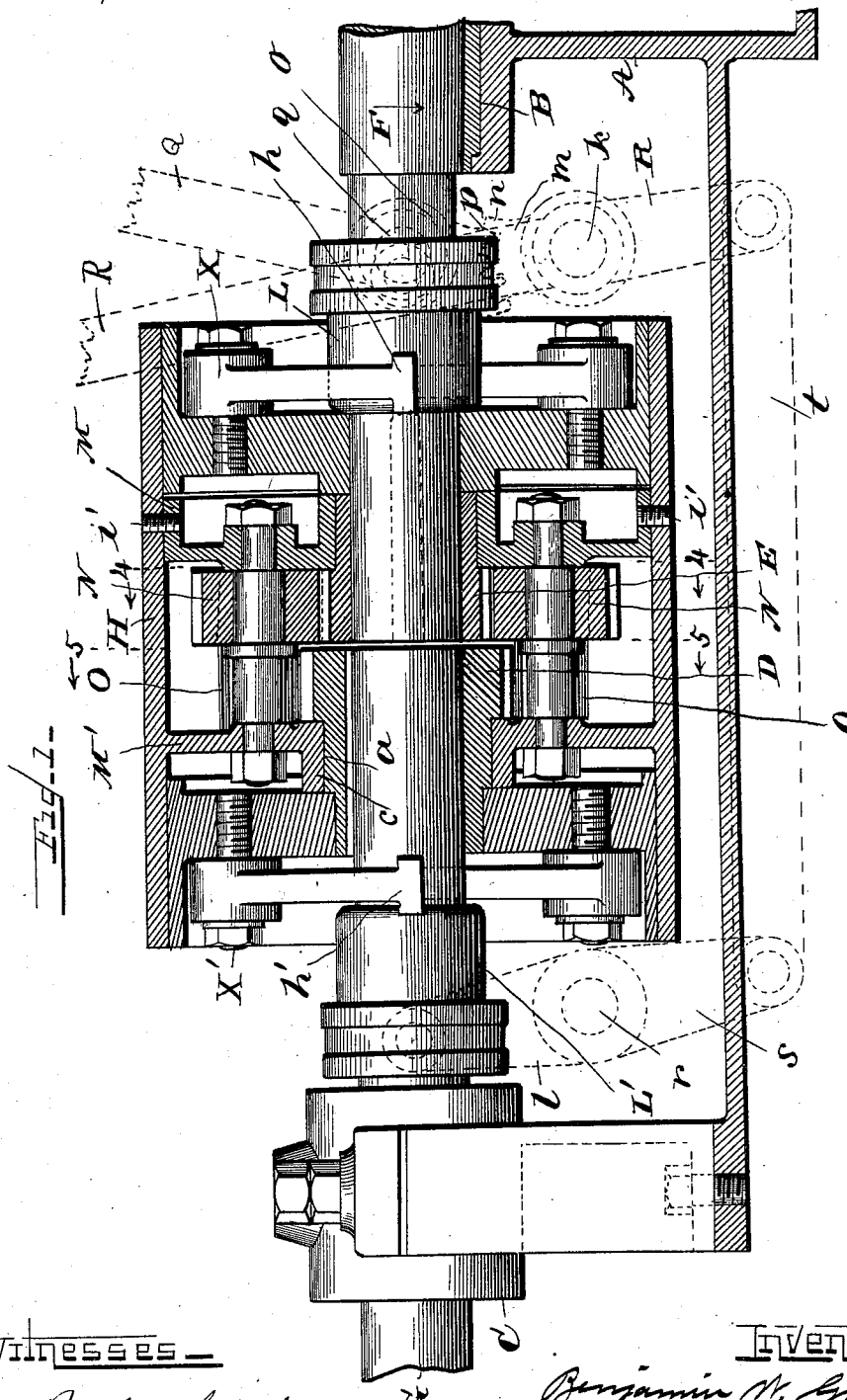
Witnesses
Inventor
Benjamin W. Grist
By D. C. Reinohl
Attorney.

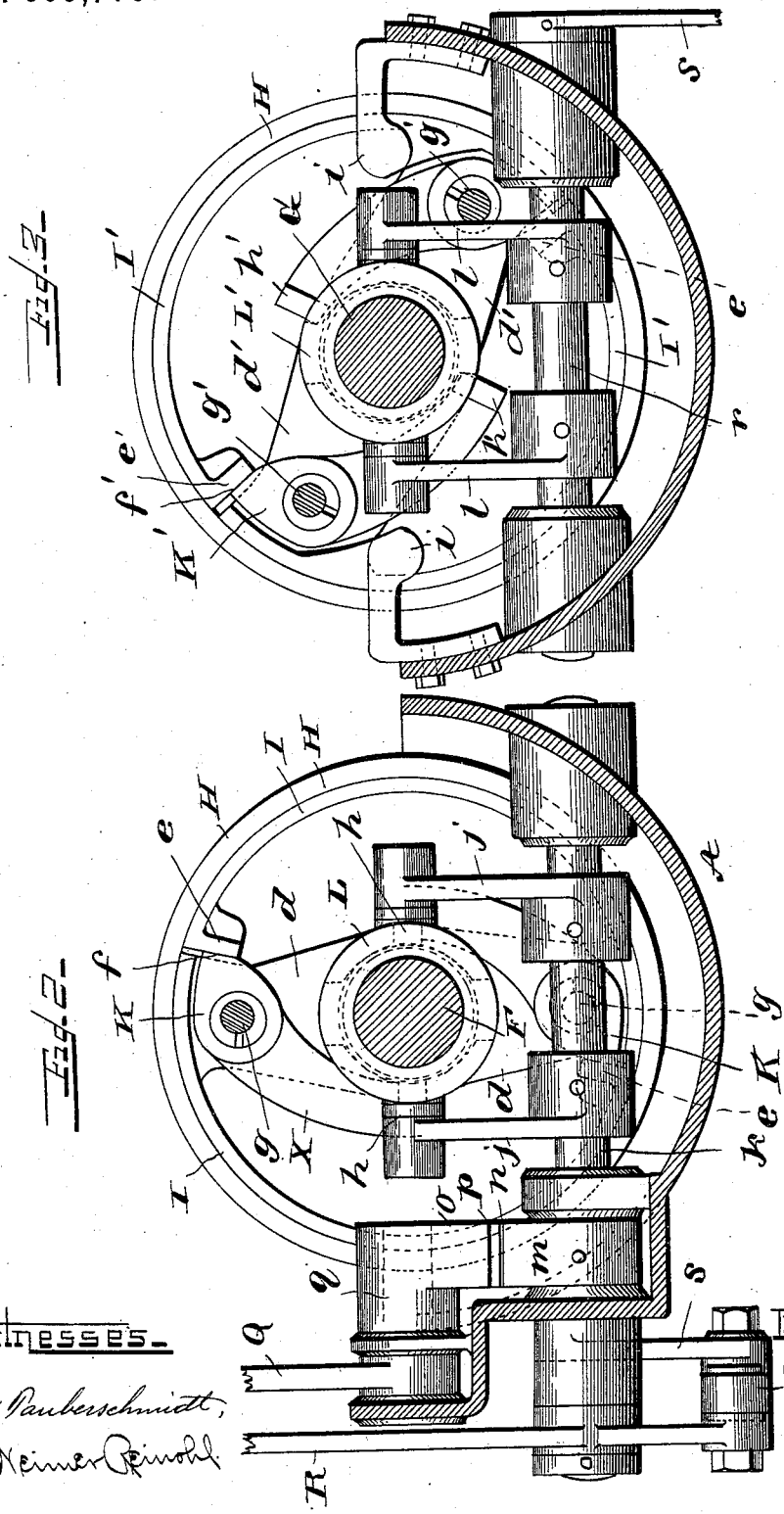

(No Model.)  3 Sheets—Sheet 3.
B. W. GRIST.
REVERSING MECHANISM FOR GAS OR OTHER ENGINES.
No. 599,779. Patented Mar. 1, 1898.
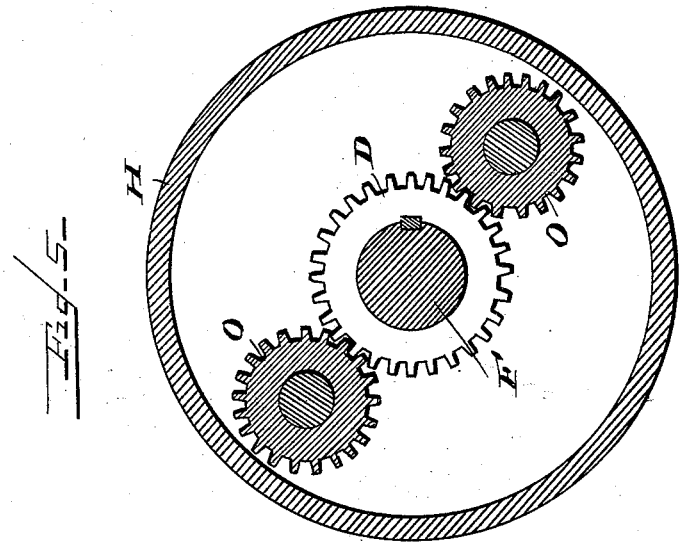
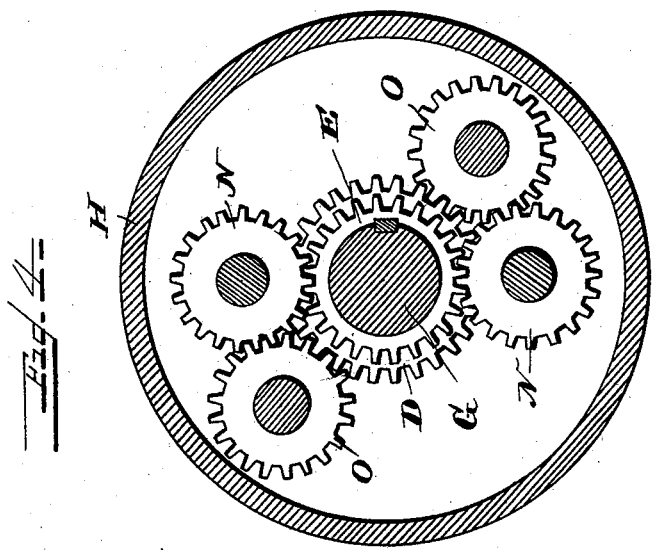

UNITED STATES PATENT OFFICE.

BENJAMIN W. GRIST, OF PHILADELPHIA, PENNSYLVANIA, ASSIGNOR TO THE PENNSYLVANIA IRON WORKS COMPANY, OF SAME PLACE.

REVERSING MECHANISM FOR GAS OR OTHER ENGINES.

SPECIFICATION forming part of Letters Patent No. 599,779, dated March 1, 1898.

Application filed October 11, 1897. Serial No. 654,856. (No model.)

*To all whom it may concern:*

Be it known that I, BENJAMIN W. GRIST, a citizen of the United States, residing at Philadelphia, in the county of Philadelphia and State of Pennsylvania, have invented certain new and useful Improvements in Reversing-Gear for Gas or other Engines; and I do hereby declare the following to be a full, clear, and exact description of the invention, such as will enable others skilled in the art to which it appertains to make and use the same.

This invention relates to reversing mechanism for screw-propellers, is designated for use on vessels of any character which are equipped with screw-propellers, and has for its object to provide means which will enable the propeller or driven shaft to be rotated in either direction and the propeller driven forward, backward, or stopped at the will of the operator while the shaft of the motor continues to rotate in one direction; also, to provide means to operate the propeller-shaft at a speed varying from the speed of the motor or driving shaft.

The invention consists in certain improvements in construction, which will be fully disclosed in the following specification and claims.

In the accompanying drawings, which form part of this specification, Figure 1 represents a longitudinal section of my invention, partly in side elevation; Fig. 2, a transverse section on line 2 2, Fig. 1, showing the arrangement of the reversing-gear for rotating the driven shaft in the same direction as the driving-shaft; Fig. 3, a transverse section on line 3 3, showing the reversing mechanism for turning the driven shaft in the opposite direction of the driving-shaft; Fig. 4, a transverse section on line 4 4, Fig. 1, showing the gearing by which motion is imparted to the driven shaft by the driving-shaft; and Fig. 5 is a similar view of the same on line 5 5, Fig. 1.

Reference being had to the drawings and the letters thereon, A indicates part of the base or frame of a motor operated by gas, gasolene, or other explosive mixture.

B is a bearing for the driving-shaft.

C is a bearing to support the driven shaft F, which is in perfect alinement with the driving-shaft G; D, a spur-wheel keyed to the inner end of the propeller-shaft; E, a spur-wheel keyed on the outer end of the driving-shaft G.

On the hub $a$ of spur-gear D is mounted a drum H by the hub $c$ of the drum engaging said hub $a$, the drum extending forward toward the motor, inclosing the gearing and clutch mechanism. The front clutch X is secured to the driving-shaft F to revolve therewith, and consists of two oppositely-arranged spring arms or shoes I, semicircular in form and connected at their inner ends to the arms $d$, radiating from the hub of the clutch, and the outer ends of arms I are provided with flanges $e$, with which the heel $f$ of the levers K engage to expand or distend the arms I to engage them with the inner surface of the drum H and constitute a friction-clutch.

The levers K are pivotally secured to the arms $d$ at $g$, and their inner ends $h$ engage a longitudinally-movable spreader L, rounded at its front end to facilitate the entrance of the spreader between the ends of the levers K to separate them and expand the arms or shoes I.

The rear clutch X' is supported on hub $a$ of spur-gear D, said clutch being held from rotating by stops $i\ i$, secured to the frame A of the engine, and the spur-gear D revolves free at the forward-and-backward motion. The propeller or driven shaft G will be at rest when not engaged in forward-or-backward motion. The construction and operation of the rear clutch X' is the same as clutch X, and consists of shoes I' and lever K', pivotally secured to the arms $d'$ at $g'$, and their inner ends $h'$ engage a longitudinally-movable spreader L', mounted upon the shaft G.

Crossing the drum H transversely is a disk M, which is permanently secured thereto by suitable rivets or bolts $i'$ and supports pinions N and O. Pinions N engage with spur-gear E and pinions O. Spur D on driving-shaft F imparts motion to pinions N and O, supported by the transverse permanent disk M'. The pinions O being longer than pinions N allow the same to engage with spur-gear D. A series of gears similar to D and E of different diameters may be used, so that the speed of the driving-shaft (when pinions are brought into use for driving said shaft) shall be at a higher or lower rate of speed than the engine or driving shaft E, the diameter of the gears and pinions being proportioned to the number of revolutions of the shaft G desired.

The spreader L is engaged on each side by cranks j, mounted upon a rock-shaft k, which is supported in the engine-frame, and at one end of said shaft is an arm m, provided with a rack P, which engages the arm o, having a rack p, mounted on rock-shaft q, and is operated by hand-lever Q.

The spreader L' is fitted on propeller-shaft G, operated by crank l on shaft r, and said shaft carries on its outer end arm s, which in turn is connected by rod t to lever R.

The operation is follows: The engine having been started the shaft F will revolve in the direction of arrow on Fig. 1, and while the lever Q is placed in the same position as lever R, as shown in Fig. 1, both clutches are disengaged from the drum H, thus allowing the shaft F to revolve freely without communicating motion to the shaft G. When it is desired to move the vessel forward or impart the motion of the driving-shaft to the driven shaft in the same direction, the lever Q is placed in position, as shown by Fig. 1, spreader L engages with levers K, which expands friction-clutch I, causing drum H to revolve with shaft F and transmit motion in the same direction to propeller or driven shaft G through the medium of the pinions O, which are prevented from revolving, the same being brought to a standstill by the clutch I and drum H, engaging the whole reversing mechanism and revolving in a body with shaft F, the teeth of pinion O locking in teeth of spur-gear D, carrying shaft G with it.

When it is desired to reverse the motion of the vessel or driven shaft, the lever Q is thrown to the left, as shown in dotted lines in Fig. 1, and the lever R placed in position toward the right, as shown in dotted lines in ths same figure. This will engage friction-clutch X' on rear end of machine with the drum H, holding the same from turning. In this position spur-gear E imparts motion to pinions N O, the latter giving a reverse motion to the spur-gear D. When it is necessary to stop the propeller, place both levers Q and R in the position of lever R, as shown in Fig. 1. The drum H being released from the clutches will revolve freely, the pinions O, traveling around gear D, allowing the same to stand still. It will be observed that the motion or direction of the engine-shaft is always the same, and no reversing of the engine is required to reverse the direction of the propeller or driven shaft, thus dispensing with the difficulty of reversing the gas or other engine.

Having thus fully described my invention, what I claim is—

1. An engine or driving shaft having a spur-wheel on one end thereof, and a propeller or driven shaft having a spur-wheel on one end, in combination with a drum having transverse disks, gearing supported by said disks and engaging the spur-wheels respectively, a clutch mechanism at each end of the drum, a longitudinally-movable spreader for each clutch mechanism supported respectively by said shafts and reversing-levers.

2. An engine or driving shaft and a propeller or driven shaft in alinement therewith and each shaft provided with a spur-wheel, two oppositely-arranged spring arms or shoes and a longitudinally-movable spreader on each shaft, in combination with a drum inclosing said spring arms or shoes and with which they engage on its inner surface and gear-wheels supported upon transverse disks in the drum and engaging said spur-wheels, in combination with a reversing-lever and suitable connections for operating said spring arms or shoes.

3. An engine or driving shaft and a propeller or driven shaft in alinement therewith and each provided with a spur-wheel, a drum and gear-wheels supported by the drum in engagement with said spur-wheels, in combination with a clutch mechanism consisting of the two oppositely-arranged spring arms or shoes and a longitudinally-movable spreader on each shaft, an interposed pivoted lever between the spring-arms and the spreader, a reversing-lever and suitable connections between the lever and the clutches.

4. The combination of a driving and a driven shaft, a drum, suitable gearing connecting the shafts and the drum, a clutch mechanism consisting of a pair of oppositely-arranged spring arms or shoes supported upon each of said shafts and engaging the inner surface of the drum, a lever pivoted to each of said spring-arms and engaging the other spring-arm at its outer end, a longitudinally-movable spreader upon each of said shafts and engaging the inner ends of said levers and means for operating the spreaders.

In testimony whereof I affix my signature in presence of two witnesses.

BENJAMIN W. GRIST.

Witnesses:
   CHAS. DICKERMAN,
   WM. HANSON.